(Model.)
2 Sheets—Sheet 1.
J. WIGGER.
ANIMAL TRAP.
No. 463,238.  Patented Nov. 17, 1891.
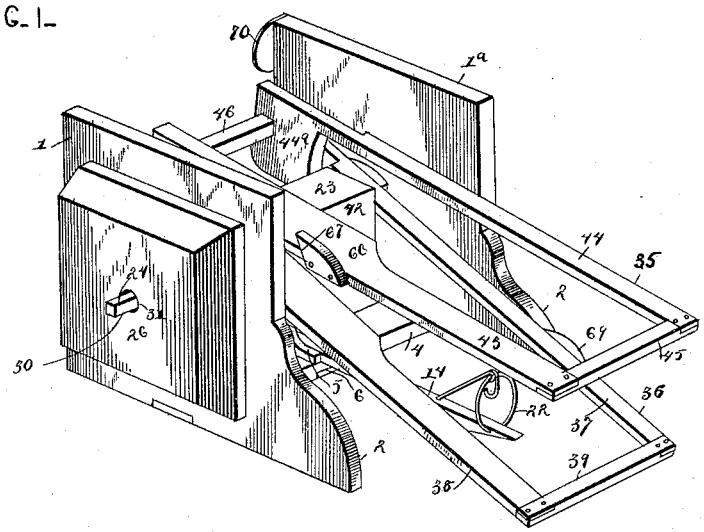
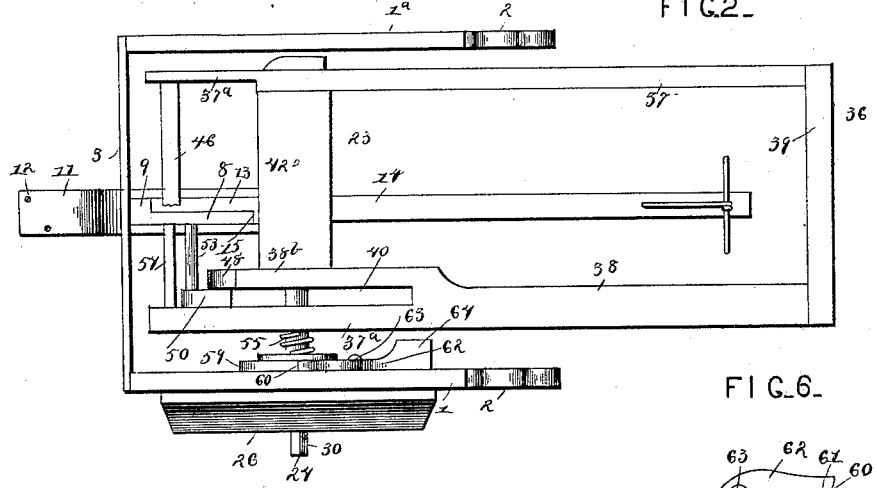
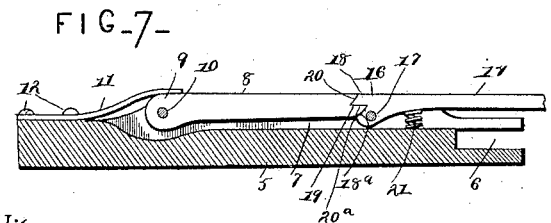
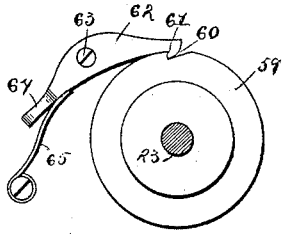
Witnesses
Geo. E. Frick.
H. F. Riley
Inventor
John Wigger.
By his Attorneys,
C. A. Snow & Co.

(Model.)
2 Sheets—Sheet 2.
J. WIGGER.
ANIMAL TRAP.
No. 463,238.
Patented Nov. 17, 1891.
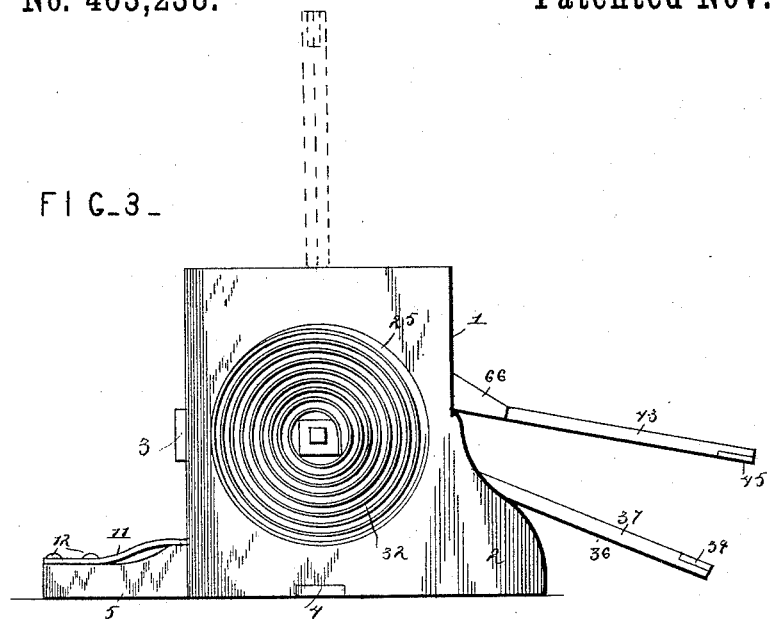
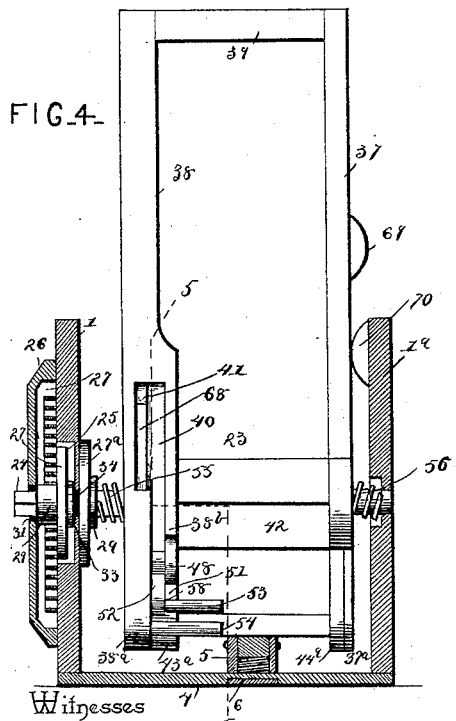
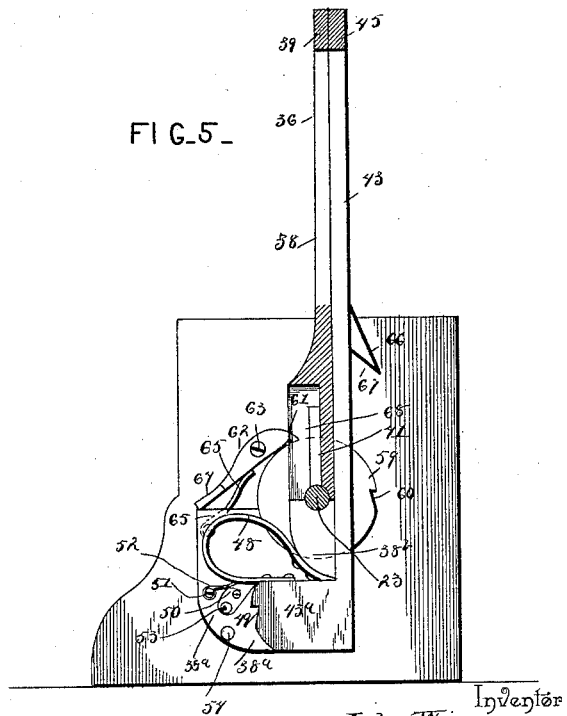
Witnesses
Inventor
John Wigger
By his Attorneys,

UNITED STATES PATENT OFFICE.

JOHN WIGGER, OF RICH HILL, MISSOURI.

ANIMAL-TRAP.

SPECIFICATION forming part of Letters Patent No. 463,238, dated November 17, 1891.

Application filed October 31, 1890. Serial No. 369,888. (Model.)

*To all whom it may concern:*

Be it known that I, JOHN WIGGER, a citizen of the United States, residing at Rich Hill, in the county of Bates and State of Missouri, have invented a new and useful Trap, of which the following is a specification.

My invention relates to improvement in traps designed especially for the catching of game, it being automatic in its action and resetting after each bird or animal is caught, thereby enabling it to catch and cage a quantity of game before requiring the attention of the trapper.

To these ends my invention consists in certain features of novelty to be hereinafter described, and then particularly pointed out in the claims.

In order that my invention may be fully understood, I will now proceed to describe it with reference to the accompanying drawings, in which—

Figure 1 is a perspective view showing the trap set ready to act. Fig. 2 is a top view, the parts being in position shown in Fig. 1, with the upper jaw removed. Fig. 3 is a side view, the casing of the winding mechanism being broken away to show the mechanism and the jaws being shown in full lines in the position shown in Fig. 1 and in dotted lines in closed position just before they reach their lowermost position open. Fig. 4 is a transverse vertical section longitudinal of the shaft, looking toward the rear of the trap, the jaws being in vertical closed position. Fig. 5 is a section on line 5 5, Fig. 4, the jaws being partly broken away. Fig. 6 is a side view of the detent and disk that prevent the winding or clock mechanism from acting. Fig. 7 is a longitudinal sectional view of the base that supports the bait lever or trigger and its detent, the lever being broken off.

This device, it is to be understood, is to be used in connection with any suitable receptacle—such as a cage—provided with the ordinary trap-door, through which the game is projected into the cage by the trap, behind which the cage is situated. I have deemed it unessential to encumber the drawings with the unnecessary illustration of a cage, as it has nothing to do with the operation of the trap and its purpose will be apparent.

1 1$^a$ are the sides or standards of the trap, provided with extensions 2, projecting from the opposite front edges. At the back and connecting the edges of the sides is a brace 3. The bottoms of the sides are connected at about midway by a cross-strip 4, that is recessed to receive the supporting-base 5 of the bait trigger or lever, said base having an open slot or recess 6 to receive the reduced portion of said strip. The base 5 is elongated and has a longitudinal groove 7. At one end of the groove 7 is pivoted a detent 8, the latter being set to one side of its heel 9, through which the pivot-pin 10 passes. Upon the end of the heel 9 a plate-spring 11 bears, said spring being secured to the base at 12. The outer side of the detent 8 comes against the wall at one side of the groove, a space being left between its inner side and the wall at the opposite side of the groove, said space receiving the offset end 13 at the rear end of the bait trigger or lever 14, the end of offset portion 13 terminating contiguous to the shoulder 15 of the detent.

At the side of the offset portion 13 of the bait-trigger is a shoulder 16, through which the pivot-pin 17 passes. Said shoulder 16 is directly in front of the end of the detent and has a tooth 18 and a notch 18$^a$ below it just above the pivot 17, said tooth being adapted to engage a notch 19, formed by two teeth 20 20$^a$ at the end of the detent. In front of the pivot 17 and below the bait-trigger is a coiled spring 21, the tendency of which is to throw the front end of the bait-trigger up. At the front end of the bait-trigger is a wire frame 22, that constitutes a bait-holder.

Extending across and journaled in the sides 1 1$^a$ of the trap is a transverse shaft 23, having an extension 24 projecting beyond the side 1. The outer face of the side 1 has a cavity 25, which is closed by a cover or cap 26, having a cavity 27, forming a chamber in connection with cavity 25, said parts constituting a casing for containing the winding or clock mechanism.

The winding mechanism is constructed as follows: 27$^a$ is a wheel or disk that has a perforation to receive the extension 24 of shaft 23, on one side of which wheel is an axial socket-piece 29, the perforation or opening of which is an extension of perforation or opening of the wheel 27$^a$. At the end of the socket-piece is a squared portion 30 to receive a key for winding the mechanism, said squared portion extending through opening 31 in the cover or cap 26. One end of a spring 32, that is coiled around the socket-piece 29, is secured to the latter and the other end is secured to the cover or cap 26, the tendency of the spring being to turn the wheel 27$^a$ in the direction indicated by the arrow. The spring is tightened or wound by turning the wheel 27$^a$ in the direction opposite to that indicated by the arrow. Pivoted to the inner face of the wheel 27$^a$ is a spring-operated pawl 33, that is adapted to engage with a circular series of ratchet-teeth 34 on the extension 24 and prevent the wheel from turning on the extension in the direction indicated by the arrow, but permit of its being turned in the opposite direction when winding up the coiled spring 32.
Pivoted on the shaft 23 are the upper and lower jaws 35 and 36, respectively. The lower jaw 36 is composed of two side bars 37 and 38, connected at the operative end of the jaw by a cross-strip 39, the lower end of bar 37 adjacent the side 1$^a$ having a cheek-piece 37$^a$ and the lower end of bar 38 being bifurcated to form an opening 40 between the cheek-piece 38$^a$ and the heel 38$^b$, composing the forks formed by said bifurcation. The shaft 23 extends through the bars 37 and 38 just above the cheek-pieces 37$^a$ and 38$^a$, said cheek-pieces being opposite and projecting from the under sides of the bars. The opening 40 in bar 38 extends above the shaft 23, and the bar is formed at the outer and upper side of the opening with an offset 41, that constitutes a stop or shoulder, for a purpose to be hereinafter referred to. The shaft 23 is squared and enlarged (42) between the side bars 37 and 38 of the lower jaw to prevent the inward movement of the bars. The upper jaw 35 is composed of two side bars 43 and 44, connected at the operative end of the jaw by a cross-strip 45, having at their lower ends heels 43$^a$ and 44$^a$, respectively, offset to their inner sides and fitting between the cheek-pieces 37$^a$ and 38$^a$. The two jaws are of the same length. Connecting the lower ends of the bars 43 and 44 of the upper jaw is a cross-bar 46, that extends beyond the sides of the jaw to provide trunnions or journals 47, that have bearing in the openings at the lower ends of the side bars of the lower jaws 36. Secured at one end to the under side of the heel 38$^b$ of the lower jaw and at the other end to the upper side of the heel 43$^a$ of the upper jaw is a V-spring 48, the tendency of which is to close the jaws. 49 is an inclined tooth on the heel 43, that is adapted to be engaged by a pawl 50, pivoted at 51 to the inner side of cheek-piece 38$^a$ of the lower jaw and pressed into engagement with the tooth by a spring 52, secured to said cheek-piece. Projecting laterally from the heel of the pawl is a pin or stud 53. Extending laterally from the inner side of cheek-piece 38$^a$ below the pawl 50 is projection 54, that constitutes what I will term a "resetter," as it is adapted to reset the bait device, as will be hereinafter described. Coiled around the shaft 23 near each end are springs 55 and 56, spring 55 being secured at one end to the shaft and at the other end to the outer side of side bar 38 of the lower jaw and spring 56 being arranged in a recess 58 in the inner side of side 1$^a$ and being secured at one end to the latter and at the other end to the outer side of side bar 37 of the lower jaw. The purpose of these springs is to cause the jaws to return from the position shown in dotted lines in Fig. 3 to the forward position shown in full lines. On squared portion 42 of the shaft between the side 1 of the trap and the spring 55 is a disk 59, having a peripheral tooth 60. Tooth 60 is adapted to be engaged by a tooth 61 at the inner side of the upper end of the detent 62, pivoted at 63 to the inner side of side 1. At the lower end of the detent is an inwardly-projecting shoulder 64. A spring 65 presses the toothed end of the detent 62 against the periphery of the disk, so that it may engage the tooth 60 of the latter. On the outer side of the side bar 43 of the upper jaw 35 is a lug 66, having an incline 67, said lug constituting a "trip," for the purpose to be hereinafter described. An arm or finger 68 projects laterally from the shaft 23 between the forks of the bifurcated side bar 38 of the lower jaw. This arm or finger 68 is adapted to pass through the opening 40 and also to engage the stop or shoulder 41 at one side of the opening. A lug 69 on the outer side of side bar 37 of the lower jaw is adapted to engage a cam projection 70, extending inwardly from the rear of the side 1$^a$.

My improved trap being constructed as above set forth, its operation is as follows: The clock mechanism having been wound up and the bait-holder baited, the trap is ready to catch a quantity of game, a suitable trap-door cage being set in proper position behind the trap. The position of the parts when set is as shown in Fig. 1—i. e., the bait will be situated between the jaws 35 and 36. The animal or visitor will pass its head between the jaws and bite at the bait. In trying to release the bait from its holder 22 the bait-trigger 14 will be drawn down and overcome the upward pressure of the spring below it and its offset end 13 and shoulder 16 will be elevated, whereby the tooth 18 is disengaged from the notch between the teeth 20 20$^a$ at the end of detent 8, thus releasing the detent and permitting the spring 11 to throw it swiftly up on its pivot. As the detent flies up and back it strikes against the pin or stud 53 of the pawl 50 and releases the latter from engagement with the tooth 49 of the heel 43 of the upper jaw, permitting the V-spring 48 to close the jaws and grasp the intruder. As the upper jaw comes down toward the lower jaw, inclined end 67 of the trip or lug 66 on side bar 43 engages the shoulder 64 of detent 62, tripping the latter and disengaging its tooth 61 from the tooth 60 of disk 59. The spring 32 of the clock mechanism being stronger than the springs 55 and 56, that tend to throw the jaws forward, will now turn the wheel 27, disk 59, and shaft 23 in the direction of the arrow, the pawl 33 being in engagement with the ratchet-teeth 34 on extension 24. This turning of the shaft 23 will, through the medium of the arm or finger 68 thereon that is in engagement with the stop or shoulder 41, throw the jaws and their captive backward, and when the lug 69 on the lower jaw 36 comes into engagement with the cam projection 70 the jaws will be shifted laterally on the shaft 23, compressing spring 55 and expanding spring 56. This shifting movement of the jaws will disengage the arm or finger 68 from the shoulder 41 and permit the shaft to turn independently of the lower jaw, whose movement is limited by the cam projection 70. Just before the jaws are shifted the resetter 54 on cheek-piece 38ª of the lower jaw will engage the raised detent 8 and throw it down, causing its teeth 20 20ª to engage tooth 18 of the bait-trigger 14, thus resetting the baiting device. As the shaft turns farther, its arm or finger 68 will be brought in contact with the inner face of the side bar 43 of the upper jaw, thus acting to separate and open the jaws, whereby the captive is released and deposited into a suitable receptacle at the rear. As soon as the captive is released the jaws of the trap will be automatically reset. When the jaws are completely open, the tooth 49 of the upper jaw will be in position to be again engaged by the pawl 50. The return forward movement of the open jaws is induced by the springs 55 and 56, which shift the jaws laterally to their original position on the shaft on which they swing as they move forward. When the jaws reach their operative forward position, the shaft 23 will have turned until the arm or finger 68 reaches its original position, so as to engage behind the shoulder 41 and until the tooth 60 is again engaged by the tooth of detent 62. The trap will now be in operative position to catch more game.

Quite a large quantity of game can be caught before the clock mechanism will require rewinding.

What I claim is—

1. In a trap, the combination of a clock mechanism, a shaft adapted to be operated thereby, a pair of jaws pivoted on the shaft, a bait device, means for opening and closing said jaws, and springs for throwing the jaws forward in open position, said clock mechanism being designed to throw the jaws rearwardly, substantially as set forth.

2. In a trap, the combination of a shaft, means for turning it, a pair of jaws pivoted thereon, a spring for closing the jaws, mechanism for holding the jaws open, a bait device, and means in connection therewith for releasing said holding mechanism, substantially as set forth.

3. In a trap, the combination of a shaft, means for turning it, a pair of jaws pivoted thereon, means for closing the jaws, a spring-pressed pawl engaged by a cam on one of the jaws, a tooth on the other of said jaws adapted to be engaged by said pawl to hold the jaws open, a bait device, and means in connection therewith and with the pawl for automatically releasing the latter, substantially as set forth.

4. In a trap, the combination, with a pair of jaws, means for closing the jaws, and mechanism for holding them open, of a bait device, the same comprising a bait-trigger, and a spring-operated detent adapted to act upon said holding mechanism, substantially as set forth.

5. In a trap, the combination, with a pair of jaws, means for closing the jaws, and mechanism for holding them open, of a bait device, the same comprising a bait-trigger having a tooth, and a spring-operated detent having a notch to receive said tooth and adapted to act upon said holding mechanism, substantially as set forth.

6. In a trap, the combination, with a pair of jaws, means for closing the jaws, and mechanism for holding them open, consisting of a spring-pressed pawl on one of the jaws having a stud or pin and a tooth on the other jaw engaged by the latter, of a bait device, the same comprising a bait-trigger having a tooth and a spring-operated detent having a notch to receive said tooth and adapted to act upon said holding mechanism, substantially as set forth.

7. In a trap, the combination of a bait device, a shaft, a pair of jaws pivoted on the shaft, means for turning the shaft, mechanism for holding the jaws open, means for closing the jaws, means in connection with the bait device for releasing said holding mechanism, a disk provided with a tooth and fixed on the shaft, a detent engaging said tooth, and a trip-cam carried by one of the jaws adapted to disengage said detent from the tooth when the jaws close, substantially as and for the purpose set forth.

8. In a trap, the combination of a bait device, a shaft, means for turning the shaft, jaws pivoted on the shaft, means for holding the jaws open, means for closing the jaws, means in connection with the bait device for releasing said holding mechanism, a disk on the shaft provided with a tooth, a detent engaging said tooth, a trip carried by one of said jaws for engaging the detent to disengage it from the tooth when the jaws close and thus permitting the turning of the shaft to swing the jaws backwardly, and springs for throwing the jaws forwardly independently of the turning of said shaft, substantially as set forth.

9. In a trap, the combination of a bait device, a shaft, means for turning the shaft, jaws pivoted on the shaft, means for holding the jaws open, means for closing the jaws, means in connection with the bait device for releasing said holding mechanism, an arm or finger projecting from the shaft, a shoulder or stop on one of the jaws, adapted to be engaged by said arm, means for shifting the jaws laterally to disengage the arm from the shoulder and to permit it by the further revolution of the shaft to open the jaws, and means for returning the jaws to forward position, substantially as set forth.

10. In a trap, the combination of a bait device, a shaft, means for turning the shaft, jaws pivoted on the latter, means for holding the jaws open, means for closing the jaws, means in connection with the bait device for releasing said holding mechanism, a disk on the shaft provided with a tooth, a detent engaging said tooth, a trip-cam carried by one of said jaws for engaging the detent to disengage it from the tooth when the jaws close, thus permitting the turning of the shaft, an arm or finger projecting from the shaft, a shoulder or stop on one of the jaws, adapted to be engaged by said arm, means for shifting the jaws laterally to disengage the arm from the shoulder and to permit it by the further rotation of the shaft to open the jaws, and means for returning the jaws to forward position, substantially as and for the purpose set forth.

11. In a trap, the combination of a bait device, a shaft, means for turning the shaft, jaws pivoted on the shaft, means for holding the jaws open, means for closing the jaws, means in connection with the bait device for releasing said holding mechanism, an arm or finger projecting from the shaft, a shoulder or stop on one of the jaws adapted to be engaged by said arm, a fixed cam projection, a lug on one of the jaws, adapted to engage the cam projection to shift the jaws laterally on the shaft to disengage the arm from the shoulder and to permit it by the further revolution of the shaft to open the jaws, and means for returning the jaws to forward position, substantially as and for the purpose set forth.

12. In a trap, the combination of a bait device, a shaft, means for turning the shaft, a pair of jaws pivoted to each other, one of the jaws being pivoted on the shaft, and suitable mechanism for operating the jaws, substantially as and for the purpose set forth.

In testimony that I claim the foregoing as my own I have hereto affixed my signature in presence of two witnesses.

JOHN WIGGER.

Witnesses:
 S. H. SMALLEY,
 J. M. McKIBBEN.